United States Patent [19]

Kawasaki et al.

[11] Patent Number: 4,553,211

[45] Date of Patent: Nov. 12, 1985

[54] VENDING MACHINE WITH DOORS

[75] Inventors: Kikuo Kawasaki; Tomomi Sano, both of Kawasaki, Japan

[73] Assignee: Fuji Electric Co., Ltd., Kanagawa, Japan

[21] Appl. No.: 525,500

[22] Filed: Aug. 22, 1983

Related U.S. Application Data

[63] Continuation-in-part of Ser. No. 261,193, Apr. 22, 1981, abandoned.

[30] Foreign Application Priority Data

Aug. 29, 1979 [JP] Japan .............................. 54-109017
Aug. 29, 1979 [JP] Japan .............................. 54-109018

[51] Int. Cl.$^4$ ....................... G07F 7/08; G06K 19/06
[52] U.S. Cl. ..................................... 364/479; 235/381
[58] Field of Search ............... 364/479; 235/381, 382; 340/825.35, 825.32

[56] References Cited

U.S. PATENT DOCUMENTS 3,716,697 2/1973 Weir.
4,120,452 10/1978 Kimura et al..
4,179,064 12/1979 Yoshioka et al..

*Primary Examiner*—Edward J. Wise
*Attorney, Agent, or Firm*—Stevens, Davis, Miller & Mosher

[57] ABSTRACT

A vending machine system for hotels or the like is disclosed in which a plurality of remote vending machines communicate with a central processing unit to transmit thereto information on article sales. Each of the vending machines includes sensors for sensing the presence of articles in an article store and a memory for storing data indicating the number of articles which can be accommodated in the article store, the number of articles sold and the number of articles remaining to be sold for each kind of article. Counting means are provided for counting articles sold and articles added to the vending machines and for modifying the stored data. The sales number data for each type of article is transmitted from the vending machines to the central processing unit for processing.

5 Claims, 21 Drawing Figures

VENDING MACHINE WITH DOORS

This application is a continuation-in-part of U.S. Ser. No. 261,193, filed Apr. 22, 1981 now abandoned.

TECHNICAL FIELD

The present invention relates to a vending machine with doors, and particularly to a vending machine which is suitable for a guest room in a hotel and is integrated with a refrigerator body for a room in hotels or the like, an outer door of which is openable by the insertion of a sales key (for example, combined with a key holder for a guest room) or by check-in to allow a discharge of an article or articles without use of currency such as coins, and of which sales data such as kinds and numbers of discharged articles are stored in a memory provided in the sales key or transmitted to a central processing unit installed at a cashier desk in a hotel so that an actual payment to the discharged articles is settled at the time of check-out. Particularly, the vending machine can store sales data efficiently to decrease a manufacturing cost and safely against erroneous operation and tampering.

BACKGROUND ART

Hitherto, a vending machine for a hotel room of the type described above has been formed into a product called "hotel vending system", in which it is desired that sales data are read or calculated easily and accurately. The vending machine in a hotel guest room of the type as described above generally includes a wired system connected between each guest room and a front information or cashier desk through a transmission line, and a wireless system or a so-called check key system for storing sales data in a memory element incorporated into an exclusive-use key holder and reading them out at the time of check out.

In the wired system, wiring work between each room and the front desk is difficult to perform after the hotel has been constructed, and even during the construction, construction costs increase and in addition, it is difficult to change or modify the system. For these reasons, the wireless system is more preferable. However, in the wireless system, that is, in the system in which an IC memory or the like is incorporated into the key holder to store sales data therein, the memory capacity is limited so that unlimited selling is impossible, because of the limitation of storable sales data. Even in the wired system, when the format for transmission of data is once determined, the number of articles to be sold is limited, due to the transmission capacity.

In a prior art vending refrigerator, discharge ports for sales articles are allotted to each kind of article. Sales data, for example, consisting of 4-bit article code and a sales number are stored in an IC memory within a key holder in case of a wireless system. In case of a wired system, such sales data are once stored, and then the stored sales data are transmitted to a hotel front desk. In this case, since the article code of 4 bits is stored or transmitted by allotting one code to each of sales articles, the efficiency of data memory or data transmission is low.

Generally, at least ten kinds of articles are retained in a refrigerator in a hotel guest room and hence, the article code is usually formed by at least 4 bits as described above. It would be necessary that 20 to 30 articles are retained for sales to satisfy the need of hotel guests and accordingly a memory capacity or transmission capacity of 128 bits, for example, is required. Further, while such a sales number seems to be excessive at a glance, it sometimes happen in a hotel that the guests sometimes stay for many consecutive days and that many guests often stay in one room and use a single refrigerator by a group of guest. Thus, it is necessary that sales data of this bit size is stored or transmitted at a time.

On the other hand, the vending refrigerator installed within the guest room is often subjected to inadequate manipulation resulting from unfamiliarity of use of the refrigerator by a guest or to undue manipulation resulting from intentional vandalism or mischief. If such an inadequate manipulation should all be called "Vandalism", the vandalism would cause a sensor portion to be tampered or inadequate delivery of articles to be repeated resulting in a possible destruction of sales data. Particularly, the vandalism within a closed guest room is unexpectedly severe, and thus, the vending machine in a guest room is required to withstand such vandalism. In a prior art system in which sales data such as article code, sales number or the like are produced and stored at every time of sales operation, there is a great possibility that sales data are destroyed, and it is difficult to restore the thus destroyed sales data and therefore the prior art system cannot stand against such vandalism.

On the other hand, in the so-called wireless system, article sales data to be modified at every time that an article is sold are stored in an external shift register contained in a key holder or the like. A guest or user presents the key holder to the front desk at the time of check-out, so that a settlement is made on the basis of article sales data obtained from the shift register. In order to modify the article sales data at every time that an article is sold, the previous article sales data stored in the external shift register are read out to be transferred to a data processing control circuit in a vending machine, where article sales data are modified in accordance with the sold articles and the modified article sales data rewritten in the shift register as the external memory. However, when modifying and rewriting of such article sales data, there is the possibility of an occurrence of various troubles such as an error in the modification of article sales data due to contact failure of various parts or erroneous operation of apparatus.

More specifically, the shift register provided in the key holder of the vending machine for a guest room stores, in the form of a predetermined format, article sales data composed of, for example, a room number (address), an article sales number for each kind of articles, and various control signals. On the other hand, a room number is correspondingly set in a controller for processing article sales data in a vending machine installed in each guest room. When the key holder is inserted into the controller, the shift register within the key holder is connected to the circuit within the controller so that the room number read from the shift register is first collated with the room number set in the controller. Unless both the numbers coincide with each other, the key is rejected. As a result, a condition of articles sales is not enabled. In order to provide such collation of room numbers, it is necessary to read data stored in the shift register and to transfer them to the controller.

In order to read out and transfer the data stored in the shift register, it is usual that a clock pulse is applied to the shift register to successively shift the data stored in the shift register so that the data is derived from the output end. This means that the shift register becomes vacant. Accordingly, if both the room numbers coincide with each other, normal sales procedure is taken without trouble. On the other hand, if both the room numbers do not coincide with each other, the data stored in the shift register within the key holder are disappeared, while the controller is returned to its original waiting condition. Therefore, the key holder cannot be used in the room with this number. With this in view, it is necessary that another memory means is provided in the controller, so that data transferred from the shift register is once stored in this memory means, and that prior to the rejection of a key in case the inconsistency of the room numbers the data is read from the memory means so that the data is returned to the shift register in the key holder.

Thus, the prior art vending machine in a hotel guest room is required to provide an additional memory means for the safeguard against the destroy of data, if the room numbers are inconsistent, so that the stored data read out from the shift register is returned to the shift register from the controller to restore the initial condition in the shift register. The provision, however, of such an additional memory means only for the safeguard results in the decrease of a usage efficiency of memory means.

In the controlling unit of the vending machine for hotel guest room, use is made of a 4 bit one chip microcomputer, for example, for the purpose of decreasing its cost and for increasing functions. However, a memory capacity of memory circuits (ROM, RAM) in the 1 chip microcomputer is limited. An internal RAM merely has a capacity of about $4 \times 128$ bits at the maximum. Thus, the occupation of a part (for example, 36 bits) of the RAM only for temporarily storing data (for example, 36 bits) in the register within the key holder greatly decreases a usage efficiency. In addition, there is a disadvantage that the transmission and reception of data between the register and another memory means results in a great possibility in that an error in data may destroy the original data.

DISCLOSURE OF INVENTION

It is an object of the present invention to provide a vending machine with doors suitable for a guest room in a hotel which removes the disadvantages noted above, increases a use efficiency of memory for storing sales data so as to reduce a manufacturing cost and is safe or withstands against various. vandalisms.

It is another object of the present invention to provide a vending machine with doors wherein when a check key is loaded to the vending machine in a guest room so that when internal data of the shift register in the check key are transferred and written in a memory in the vending machine, the internal data in the shift register are not destroyed without a provision of an additional memory in the vending machine in order to retain the memory data, and wherein a use efficiency of memory is not decreased and article sales data are processed with a high reliability and a high efficiency, while removing those disadvantages noted above.

BRIEF DESCRIPTION OF THE DRAWINGS

FIG. 6B is a circuit diagram showing an embodiment of a key sensor;

BEST MODES FOR CARRYING OUT THE INVENTION

In the following, the present invention will be described in detail by way of embodiments with reference to the accompanying drawings.

Figure 1:
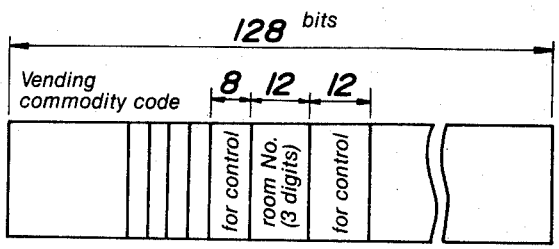
FIG. 1 is a diagram showing an example of a memory format of sales data in a conventional vending machine with doors.

First, a memory format for storing sales data in a conventional vending machine with doors for a guest room in a hotel is shown in FIG. 1 where a shift register of 128 bits, for example, is used to store sales data. If 32 bits, for example are used for discrimination of room number and for other controls, vending commodity codes indicating kinds of articles are successively recorded as article sales data at every time that one article is sold. Thus, when the vending commodity codes of 4 bits are successively recorded into 96 bits which can be used to store article sales data, the number of sales articles to be stored will be 24.

In case of hotel, a room number and other controlling data are written in a key holder at a front desk at the time of check-in. When the registered key holder is loaded to a vending machine with refrigerator in the designated guest room, the refrigerator is enabled or ready to sell articles, and when a guest opens the outer door of the refrigerator to discharge an article therefrom a commodity code of the article is written by 4 bits. As a result, the controlling data previously written in the shift register is shifted. In this manner, whenever an article is sold or discharged, the commodity code consisting of 4 bits is written and data previously written are successively shifted. Even if a key allotted to a different room number is inserted into the refrigerator, the key is rejected and therefore it follows as a matter of course that sales of articles by opening the outer door is not permitted.

Figure 2:
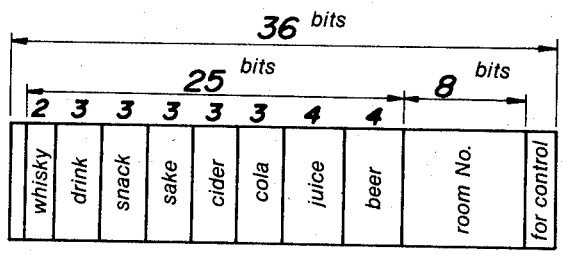
FIG. 2 is a diagram showing an example of a memory format of sales data in a vending machine with doors in accordance with the present invention.

In contrast with conventional type memory format for storing sales data as described above, a memory format according to the present invention is illustrated in FIG. 2, an IC memory with fixed memory addresses is used, instead of a shift register employed in a conventional vending machine. In the IC memory, required controlling data such as a room number are stored at fixed memory addresses and respective numbers of sold articles are stored at the following addresses kinds of articles. For example, as shown in FIG. 2, following the room number and other controlling data of 8 bits, fixed addresses each having 4 bits are successively assigned to beer and juice whose number of sold articles is relatively large, fixed addresses each having 3 bits are successively assigned to articles such as cola and cider whose number of sold articles is medium, and fixed addresses each having 2 bits are successively assigned to whisky or the like whose number of sold articles is relatively small. With this assignment of fixed addresses, by use of an IC memory having a total memory capacity of 36 bits in which the fixed addresses having 25 bits in total are assigned as shown to the storage of the respective numbers of sold articles in the respective article kinds to be handled usually by a vending machine in a guest room, it is possible to store sales data substantially equal to those of the conventional memory format which uses a shift register having a memory capacity of 128 bits as shown in FIG. 1.

That is, since only the numbers of sold articles are stored as memory data, sales data up to 15 articles at the maximum in one kind can be stored at an address having 4 bits and fixed to each kind of articles. Accordingly, sales data of up to 68 articles at the maximum, for example, may be stored with a memory capacity of 25 bits as shown in FIG. 2. Generally, the manufacturing cost of IC memory is proportional to its memory capacity, and accordingly if the shift register of the memory format shown in FIG. 1 is compared with the IC memory of the memory format shown in FIG. 2, the IC memory according to the present invention as shown in FIG. 2 is more inexpensive than the shift register and has a better function.

Figure 3:
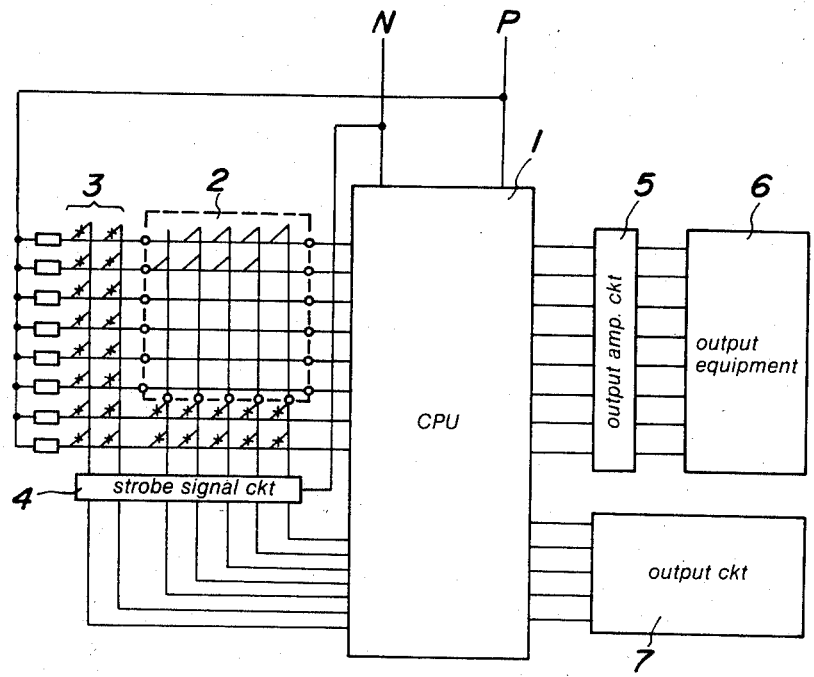
FIG. 3 is a block diagram showing an embodiment of a sales data processing system in a vending machine with doors in accordance with the present invention.

Next, FIG. 3 shows an embodiment of a sales data processing system of a vending machine according to the present invention in which the aforementioned memory format is utilized. In the sales data processing system shown in FIG. 3, numeral 1 designates a central processing unit for controlling the whole system, which may be composed, for example, of a microcomputer. The central processing unit 1 reads conditions of a commodity rack 2 having a sensor matrix which senses presence or absence of articles retained at respectively predetermined positions in the vending machine and ON and OFF conditions of controlling contacts 3 to calculate data indicating the conditions of sales and to control the drives of respective circuit as a result of the calculation. Numeral 4 designates a strobe signal circuit, which is controlled by the central processing unit 1 to generate strobe signals for writing in the central processing unit 1 the sales data from a contact matrix composed of the sensor matrix for sensing presence or absence of articles and the controlling contacts 3. Numeral 5 designates an output amplifying circuit for amplifying a control output drive signal from the central processing unit 1 on the basis of the sales data from the contact matrix, and numeral 6 designates an output unit for driving various operating sections in the vending machine by drive signals from the output amplifying circuit 5. The output unit 6 performs, for example, operations such as the opening and closing of the outer door for discharging articles and the releasing the outer door. Numeral 7 designates an output circuit for transmitting sales data processed by the central processing unit 1 to the front desk. The output circuit 7 may be an IC memory circuit within the key holder to be loaded to the vending machine in a guest room in case of wireless vending system. The output circuit 7, on the other hand, may be a receiving and transmitting circuit between a guest room and the front desk in case of a wired vending system.

Figure 4:
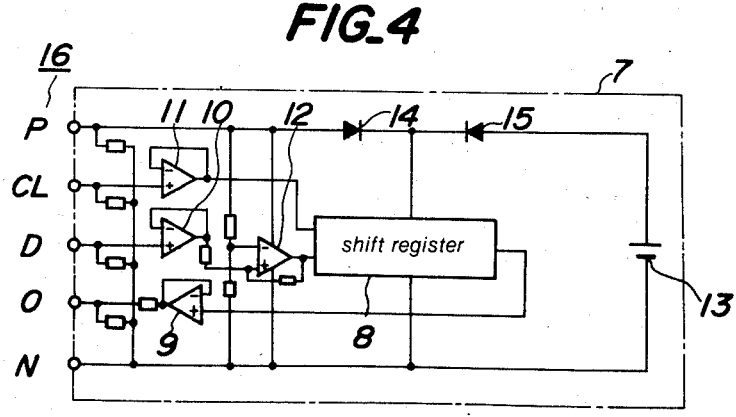
FIG. 4 is a block diagram showing an embodiment of an output circuit in a vending machine with doors in accordance with the present invention.

An embodiment of the output circuit 7 contained in the key holder in case of wireless vending system is shown in FIG. 4. In FIG. 4, a C-MOS shift register 8 of 36 bits, for example, is used as an IC memory. In sales data the number of sold articles by each kind of sold articles are arranged in the sequence of addresses by the central processing unit 1 in accordance with the memory format, for example, as shown in FIG. 2. The sales data are shifted stepwise by a clock pulse from a clock pulse input contact CL in a group of input/output contacts 16 for the delivery and or reception of signals and power supply with the central processing unit 1, so that an input from a data input contact D is successively written in the sequence of its arrival and is retained therein by a voltage of a battery 13 applied through a diode 15 for preventing current from flowing backward. At the time of settlement of account, these sales data are successively read out and derived from an output contact O. The output contacts CL, D and O are respectively connected to a shift register 8 through operational amplifiers 11, 10 and 12, 9. Power source contacts P and N for writing in and reading out sales data are connected to the shift register 8 through a diode 14 for preventing current from flowing backward.

Operations of the sales data processing system of the arrangement as described above will be outlined.

First, when the key holder having the above-mentioned output circuit 7 therein is loaded to the sales data processing unit of the vending machine in a guest room, the controlling contact 3 for detecting this setting condition is turned ON, so that the setting condition of the output circuit 7 is confirmed by the central processing unit 1. Then, data of 36 bits including a room number, the number of articles retained by each kind and controlling data which have been written at the front desk in the register 8 of the output circuit 7 in accordance with the format shown in FIG. 2 are transferred to the central processing unit 1 to check a presence of abnormality in the data, including the confirmation of the registered room number, the coincidence of controlling data, the coincidence of parity, etc. If these data are normal, selling of articles retained in the machine is enabled by opening the outer door, and for example, a sales indicating lamp is turned on and the lock of the outer door for discharging article is released. When such sales of articles is rendered available, a guest can open the outer door at any time to discharge a desired article or desired articles from the commodity rack.

Figure 5:
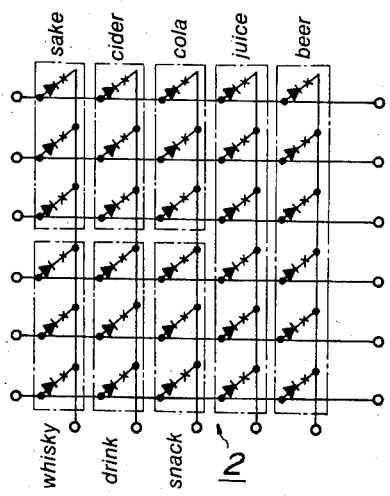
FIG. 5 is a circuit diagram showing an embodiment of a sensor matrix in a vending machine with doors in accordance with the present invention.

The commodity rack is provided with a sensor for each of articles, for example, as shown in FIG. 5. A position at which an article of each kind of articles is retained is predetermined. Therefore, when an individual article is removed from the rack, the contact of the sensor as indicated at x in FIG. 5 is closed, so that a kind and a number of sold articles are detected at the central processing unit 1 in accordance with the condition that a particular sensor contact is closed in the commodity rack and then the number of sold articles of each kind is calculated by the central processing unit 1, so that sales data in accordance with the format shown in FIG. 2 is modified at the time that a result of such a calculation is obtained.

Figure 6:
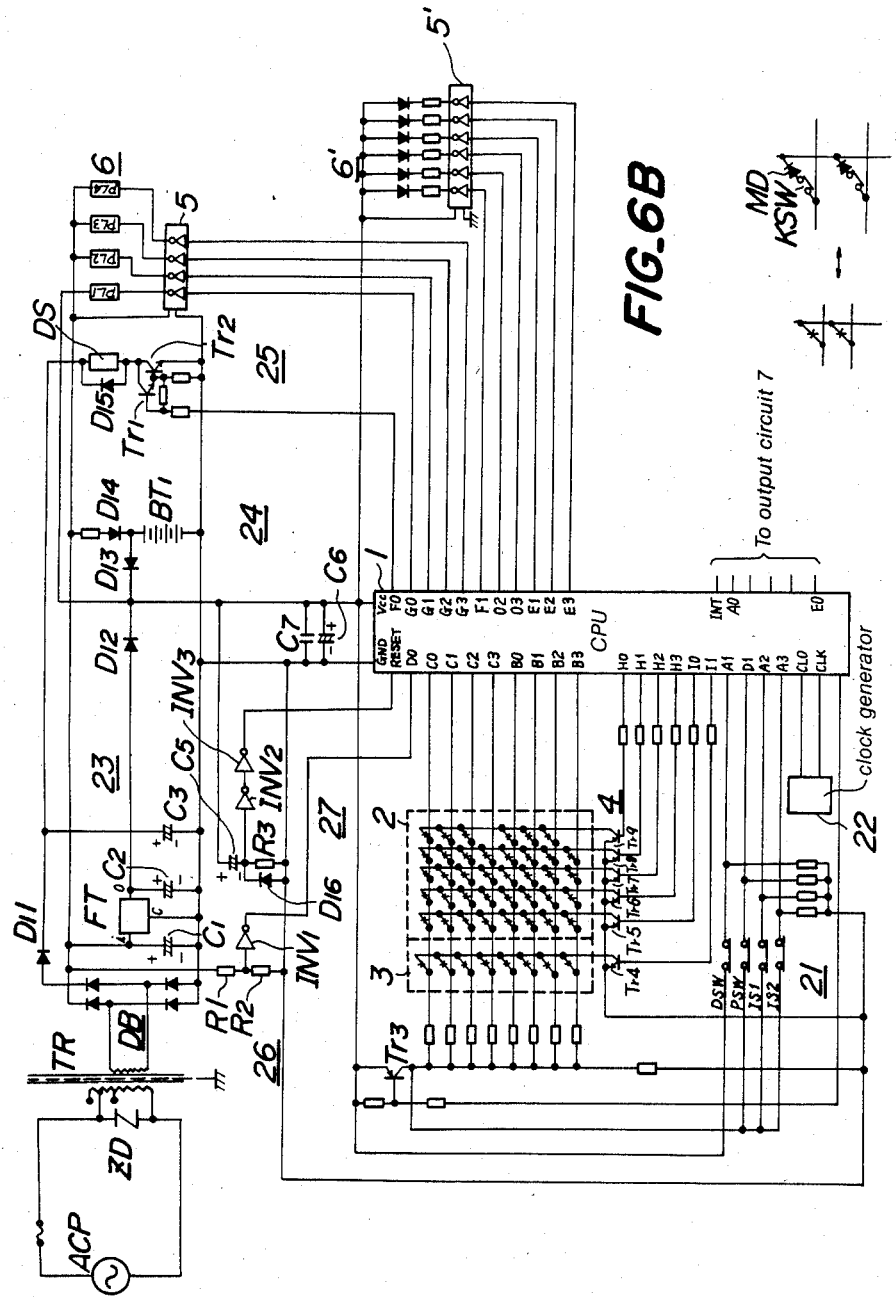
FIG. 6 is a block diagram showing an embodiment of a detailed structure of a data processing unit on the side of a vending machine according to the present invention.

Next, an embodiment of the detailed arrangement of a data processing unit on the side of the vending machine is shown in FIG. 6A. In FIG. 6A, when the output circuit 7 shown in FIG. 3 is loaded to the unit, the lock of the outer door of the vending machine such as a refrigerator is released to render sales of articles available, and then a number of articles accommodated in the vending machine is detected, so that data of sold articles as previously mentioned are prepared and transferred to the output circuit 7. These sales data processing are controlled by the central processing unit 1.

The central processing unit 1 may be in the form of a one chip microcomputer (for example, $\mu$ m COM 43C) incorporating therein an operational unit, a read only memory (ROM), a random access memory (RAM), etc. The central processing unit is driven by a clock generator 22 to perform the transmission and reception of data to and from the output circuit 7, the processing of data from the matrix circuit of the commodity rack 2 and the controlling contact circuit 3, the formation of sales data to be transmitted and the like.

In the key matrix circuit 2, key sensors are disposed in a matrix fashion, of, for example, 8 rows and 6 columns. Each key sensor is composed of a key switch KSW and a diode MD, as shown in FIG. 6B. These key switches KSW comprise, for example, 30 sensor switches corresponding to 30 articles in total and of 8 kinds and 8 switches indicating 256 vending machine numbers, and are driven by the strobe signal circuit 4 comprising transistors Tr4-Tr9 (for example, 2SC943). A sensor input circuit 21 connected to the central processing unit 1 comprises four sensor input switches; a door switch DSW for sensing the opening and closing of the outer door of the vending machine, a pin switch PSW for sensing the lock of the outer door, and two indicator switches IS1 and IS2 corresponding to information such as the article refilling completion in the vending machine.

On the other hand, an outer door locking solenoid DS driven by the central processing unit 1 is driven by a transistor amplifier 25, since the solenoid DS requires a large driving current. An output relay circuit 6 comprising relays RL1-RL4 for delivery at the time of sales of articles and so on is driven by a transistor relay driving circuit 5 (for example, ULN2004A). A display circuit 6' composed of light emitting diodes (for example, SR103D) for indicating the operating conditions of the vending machine is driven by a transistor driving circuit 5' (for example, ULN2004A).

The aforementioned components are energized by a power source circuit 23 in which an AC power from an AC power source ACP is rectified by a diode bridge DB. A voltage applied to the central processing unit 1 is stabilized by a three-terminal voltage stabilizing element FT. An interruption detecting circuit 26 is provided to detect interruption of AC power source or voltage drop from a predetermined level. A backup battery power source 24 is provided to prevent the content in the memory in the central processing unit 1 from being destroyed when an AC power is interrupted. A reset circuit 27 is also provided to reset the central processing unit 1.

In FIG. 6A, ZD denotes a Zener diode (for example, ENA650-11), TR is a voltage transformer. The power source circuit 23 comprises the diode bridge DB, capacitors C1–C3, diodes D11 and D12 (for example, SiB0-1-06), and the three-terminal voltage stabilizing element FT (for example, $\mu$ A78M06C). The backup battery power source 24 comprises a battery BT1 (for example, four Ni-Cd batteries [1.2.] connected in series) and diodes D13 and D14 (for example, 1S953). The door solenoid driving transistor amplifier 25 has output transistors Tr1 and Tr2. The output of the amplifier 25 energizes a solenoid DS. In the power interruption detecting circuit 26, an output voltage of the diode bridge DB is derived by a voltage divider composed of resistors R1 and R2. The resultant divided output is derived from an inverter INV1 (for example, MC14049BP) as a power interruption detecting output. The reset circuit 27 comprises a resistor R3, a capacitor C5, inverters INV2 and INV3 and a diode D16 (for example, 1S751). In the figure, C6 and C7 denote capacitors, and Tr3 is a transistor (for example, 2SA696).

The vending machine for a guest room in accordance with the present invention having the above-described construction and operation has the following characteristics in terms of the sales data controlling system for the vending machine of the type as described.

(1) As materials for preparing final sales data, the central processing unit has therein, for each kind of article, a reference number data showing a number of articles retained in the vending machine, sales number data showing a number of sold articles and auxiliary data or remaining number data showing a number of articles left in the vending machine.

(2) The respective data relating to numbers are prepared as follows:
The reference number data:
A number of articles retained after commencement of sales. The number starts from the number of articles left in the vending machine at the time of check-in and then is modified when articles are supplemented.
The sales number data:
A number of articles discharged from the commodity rack.
The remaining number data:
A number of articles left in the vending machine.

(3) The following relationship is obtained between the above-described data:

(The sales number data)=(The reference number data)−(The remaining number data)

(4) The data calculation in accordance with this relationship is accomplished when the outer door for discharge of articles is closed after the opening thereof.

(5) Calculation is carried out to judge whether the sum of the number of articles left in the vending machine including a supplemented article or articles and the sales number data showing a number of articles already sold after or during the supplement of articles in the vending machine is within a range of the reference number data that may be written by the format shown in FIG. 2. In case of excessive supplement, an abnormality is alarmed or a further selling is locked.

(6) Abnormal alarm of excessive supplement may be achieved by flickering the sales indicating lamp or by sounding buzzer.

While various modes of specific calculations for the respective number data may be employed, in the present invention, the calculations of various number data are carried out only when the outer door is closed after the discharge of an article or articles. The sales data obtained as a result of the calculations are modified at every time of the calculations and are written in the memory in the key holder. The respective number data can be checked by each other in accordance with the above-described formula.

Figure 12A:
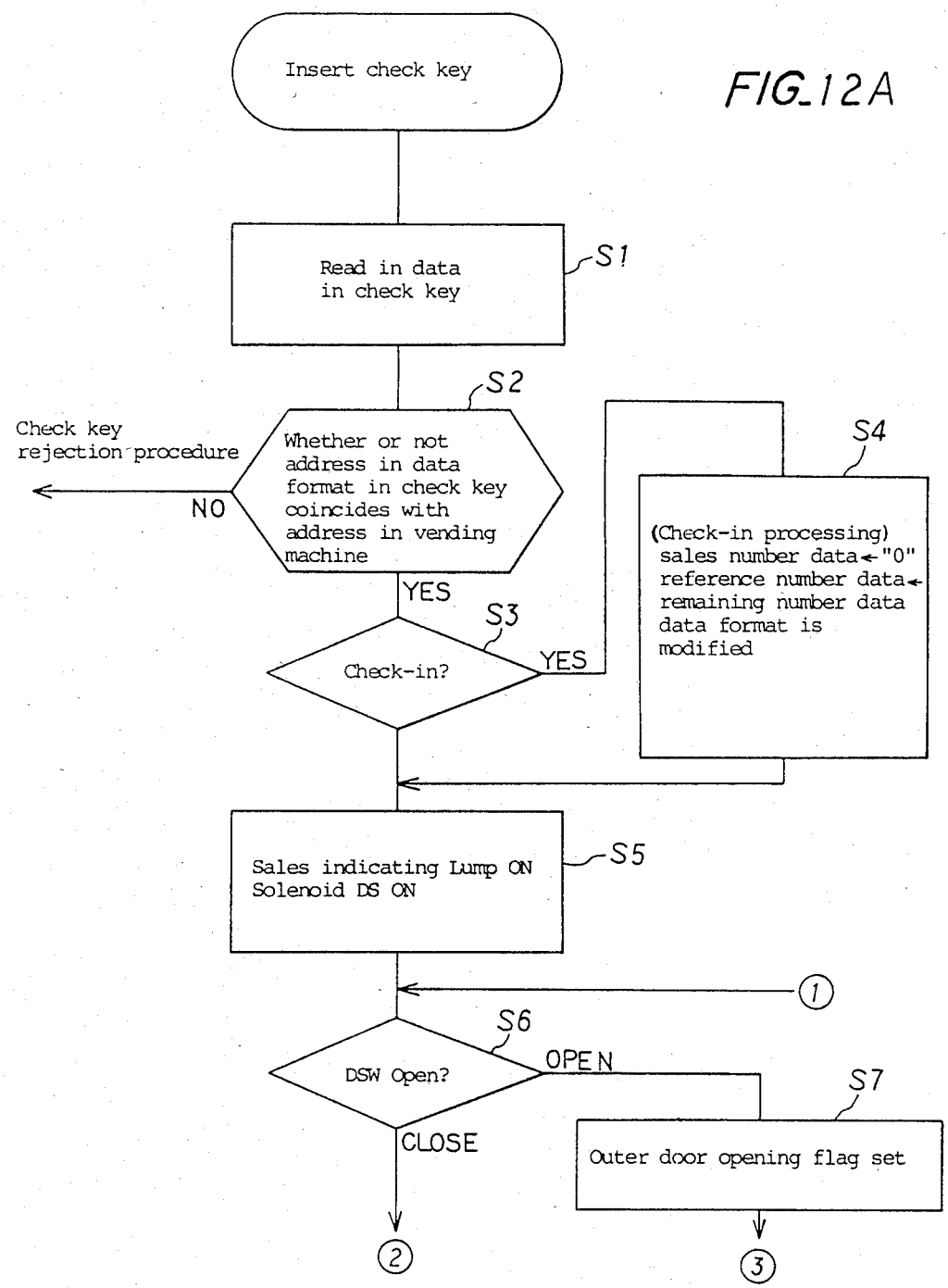
FIGS. 12A, 12B and 12C are flow charts showing a sequence of control operation to be performed in a central processing unit in a vending machine with doors in accordance with the present invention.
Figure 12B:
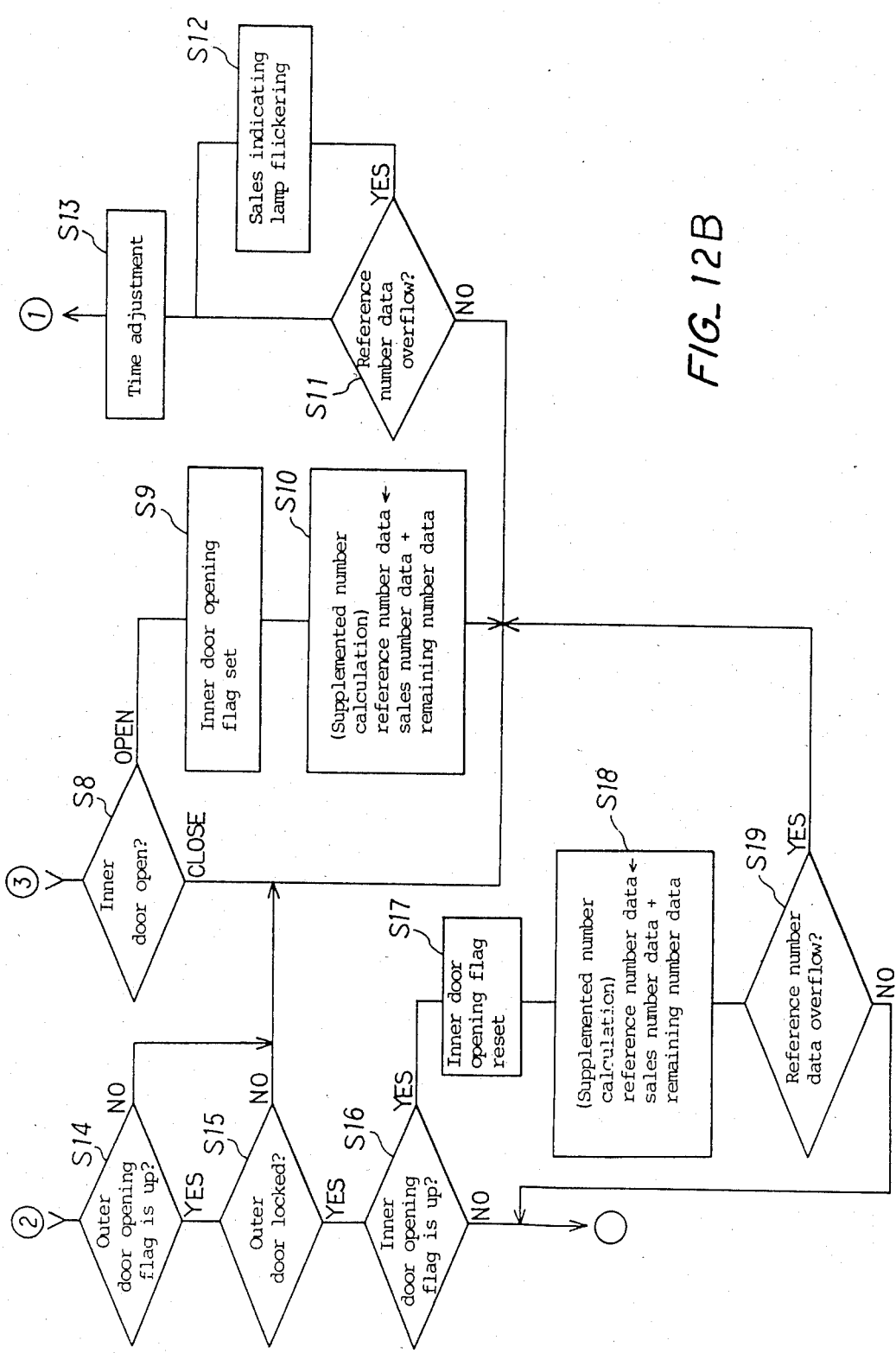
Figure 12C:
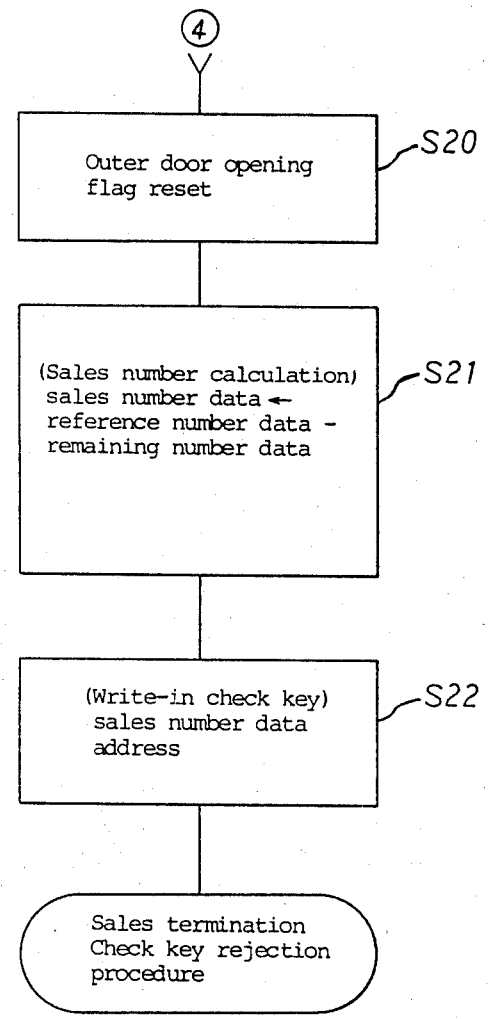

An example of controlling procedures of the central processing unit 1 in the present invention will be explained with reference to a general flowchart shown in FIGS. 12A, 12B and 12C.

First, when the check key is loaded to the vending machine, the output circuit 7 in the check key is connected to the central processing unit 1. Under the condition, the central processing unit 1 proceeds to step S1. At step S1, the central processing unit 1 reads in data such as an address, sales number data or the like stored in the check key. At the next step S2, the read-in data are compared with the data already stored in the central processing unit 1 to judge whether or not the address in the data format in the check key coincides with the address already stored in the central processing unit 1, so that an abnormality of data is checked. Usually, data following the format shown in FIG. 2 are written in the IC memory in the check key. At the initial time that a guest receives the check key from a front desk at the time of check-in, data following a predetermined format for check-in processing have been written already. At step S2, if both the addresses showing a number of the guest room do not coincide with each other, the central processing unit 1 controls to reject the loaded check key.

If both the data formats and addresses in the check key and in the central processing unit 1 are coincident at step S2, the program proceeds to step S3. At step S3, it is judged whether the data in the check key has a format for the check-in processing or not. In case that the data in the check key has the format for the check-in processing, the check-in processing is subsequently performed at step S4. The sales number data stored in the memory in the central processing unit 1 is cleared to zero and the remaining number data is set as the reference number data. In addition, the data format in the check key is modified as shown in FIG. 2. After the completion of this check-in processing, the central processing unit 1 goes to step S5. Further, if the data format in the check key is the regular format shown in FIG. 2, the central processing unit 1 goes directly to step S5 from step S3.

At step S5, the sales indicating lamp in the display circuit 6' is turned on and the solenoid DS is energized to release the lock of the outer door, so that the vending machine is ready for the sales of articles. If the solenoid DS is energized, the following step S6 judges whether or not the outer door is opened or closed by detecting the opening of the door switch DSW. In case that the outer door is opened, the program goes to step S7, at which a flag showing the opening of the outer door is set, and then goes to step S8. This step S8 judges whether the inner door is opened or not. The inner door is to be opened by a service man or an employee of a hotel in order to supplement articles. If the inner door is opened, a flag showing the opening of the inner door is up at step S9.

Subsequently, at step S10, a number of articles supplemented during a period of time from check-in unitl check-out or while the vending machine is available for sales of articles after the check-in. In order to calculate the number of articles supplemented during this period of time, remaining number data is obtained from the signals produced by the switches KSW corresponding to the articles among the key switches KSW in the key matrix circuit 2. Then, the sum of this remaining number data thus obtained and the sales number data already stored are set as reference number data. Accordingly, if an article is not supplemented after the inner door is opened, the data sum of the previous remaining number data and the previous reference number data are set. On the other hand, if an article is supplemented after the inner door is opened, the data in which the number of supplemented articles is added to the previous data are set as new remaining number data and reference number data.

After the completion of the calculation at step S10, the next step S11 judges whether or not the calculated reference number data exceeds a maximum value to be expressed by the number of bits determined in accordance with the format shown in FIG. 2. If the calculated reference number data exceeds the maximum value, the sales indicating lamp flickers at step S12. Then, a time adjustment of, for example 3.15 ms is performed at step S13. Subsequent to step S13, the program returns to step S6. On the other hand, if the calculated reference number data do not exceed the maximum value at step S11, the program goes directly to step S13 from step S11.

If step S6 judges that the door switch DSW is opened, so that the outer door is opened, the program goes to step S8 via step S7 again. Here, the operation at step S7 is not repeated, since the flag showing the opening of the outer door is up already. If step S8 judges that the inner door is opened, the flag showing the opening of the inner door is up at step S9, described above. On the other hand, if the inner door is closed like at step S8, then the program goes to step S11. In this situation, there is no article supplemented, so that the program returns to step S6 again via step S13.

During a period of time that the door switch DSW is opened and that the inner door is closed, a sales operation is performed so that a guest can obtain an article or articles. During this period of time, the calculation of sales number data is not performed.

If the door switch DSW is closed, then step S14 judges whether the flag showing the opening of the outer door is up. If the flag is not up, this means that a sales operation has not been performed, so that the program goes to step S11. In this manner, the sequential operatons from step S6→step S14→step S11→step S13→step S6 is repeated until the door switch DSW is opened.

On the other hand, if the outer door is closed so that the door switch DSW is closed, after the flag showing the opening of the outer door is up as a result that the door switch DSW is once opened, the program goes to step S15 from step S14. At step S15, the pin switch PSW judges whether the outer door is locked or not. If the outer door is not locked, the program goes to step S11.

If the outer door is locked, the program goes to step S16.

Step S16 judges again whether the flag showning the opening of the inner door is up or not. If the flag is up, the following step S17 resets the flag showing the opening of the inner door and subsequently at step S18 the calculation of a number of articles supplemented during the time period from check-in until check-out, like the processing at step S10.

The reason why the processing at step S18 is performed will follow. There is the possibility of supplementing an article even after the calculation of a number of such supplemented articles at step S10, since the inner door can be opened after this calculation at step S10. With this in view, in order to calculate a number of supplemented articles accurately, it is necessary to perform such a calculation under a condition that the outer door is locked.

Following the calculation of a number of supplemented articles at step S18, the next step S19 judges whether a new reference number data exceeds the predetermined maximum value or not, like at step S11. If the new reference number data exceeds the maximum value, the program proceeds to step S12 via step S11, so that the sales indicating lamp flickers at step S12. This flickering lamp indicates that the new reference number data exceeds the maximum value.

On the other hand, if the new reference number data do not exceed the maximum value, then the program goes to step S20, at which the flag showing the opening of the outer door is reset. Subsequently, at step S21, sales number data are calculated. The sales number data are obtained by subtracting the remaining number data from the new reference number data. After the completion of this sales number data at step S21, the address and the calculated sales number data are written in the output circuit 7 in the check key at step S22. The completion of such write-in means that the sales is terminated, so that the central processing unit 1 proceeds to the rejection procedure of the check key.

Figure 7:
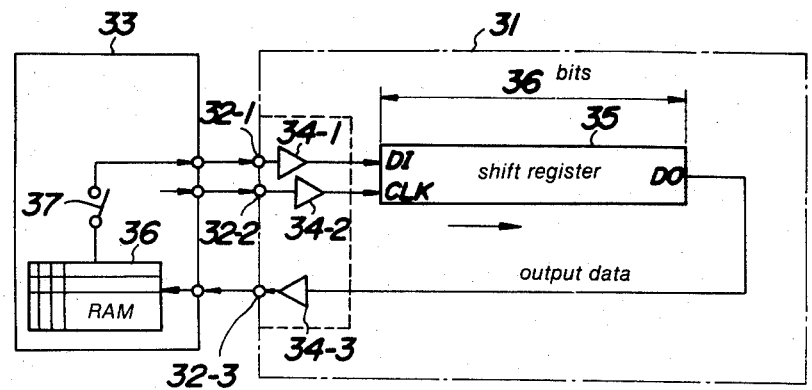
FIG. 7 is a block diagram showing a structure of a sales data transmitting and receiving section in a conventional sales data storing section.

Next, an arrangement of a data transmitting and receiving portion between the shift register in sales data memory means of a prior art vending machine with doors and the sales data processing control means in the vending machine is shown in FIG. 7.

In the arrangement shown in FIG. 7, a sales data memory unit 31 in the key holder or check key body is connected to a sales data processing control unit 33 through check key contacts 32-1, 32-2 and 32-3. The check key contacts 32-1, 32-2 and 32-3 are respectively connected to a data input terminal DI, a clock terminal CLK, and a data output terminal DO of, for example, a shift register 35 of 36 bits through operational amplifiers 34-1, 34-2 and 34-3. The operational amplifiers 34-1, 34-2 and 34-3 are provided to shape waveforms of the input data signals and to protect the shift register 35 from external static electric noises when the check key body 31 is disengaged. Although not shown, contact terminals are separately provided to apply a power source voltage from the control unit 33 for writing and reading data from and to the shift register 35 and for driving the operational amplifiers 34-1, 34-2 and 34-3. The electrical connection of the check key contacts 32-1, 32-2 and 32-3 with the contacts on the side of the control unit 33 is confirmed by sensing the insertion of the check key body 31 by means of a mechanism such as a key switch, a check switch or the like provided in the control unit 33. The subsequent circuit operations are performed after the confirmation of the electrical connection.

After the completion of this electrical connection, if 36 clock pulses supplied from a clock generator (not shown) in the control unit 33 through the check key contact 32-2 are applied to the shift register 35 through the operational amplifier 34-2, the data contained in the shift register 35 are successively shifted bit by bit in response to the successive application of the clock pulses so that the data are derived from the data output terminal DO. The data thus derived are then written in, for example, a random access memory 36 in a one chip CPU in the control unit 33 through the operational amplifier 34-3 and the check key contact 32-3 in this order.

After the transfer of the data from the shift register 35 in the check key body 31 as described above, the content of the shift register 35 is vacant. While the shift register 35 with the vacant memory content is kept connected to the control unit 33, the article sales data in the control unit 33 is processed. That is, first, in the format of the article sales data transferred from the shift register 35, the start bit, the parity bit or the like are checked and confirmed. Then, the number of the guest room or vending machine and the number of sold articles are collated. If the number in the stored data read from the shift register 35 is not coincident with the number stored in the memory 36 in the control unit 33, the stored data read from the shift register 35 and once written in the random access memory 36 are returned to the shift register 35 for restoration without modification.

Usually, it is preferable that the key to be used to lock or unlock the vending machine in a guest room is not provided with a distinctive mechanical configuration like an conventional key to coincide the key mechanically with the vending machine, but the mechanical construction of the key body itself is made common to all keys like a combination of an ordinary plug and jack, so that the collation between the individual check key 31 and the control unit 33 is made by collating the number in data. As a result of such collation of the number, the inserted key is rejected if the numbers are not coincident with each other, in order to protect article sales data from destruction due to an erroneous loading of key having a different number or in order to remove troubles resulting from failures of the circuit elements in the check key 31 or the battery for retaining the stored data.

In the prior art construction shown in FIG. 7, when rejecting the loaded key because of the inconsistency of the result in the aforesaid address collation, it is necessary to return the memory data stored in the random access memory 36 to the shift register 35 prior to such a rejection of key. To this end, the stored memory data are returned without modification to the shift register 35 to be restored therein by the following procedures. A data output controlling unit 37 which has been opened is closed to read out the once stored data. The data thus read-out are transferred to the shift register 35 through the switch 37, the check key contact 32-1 and the operational amplifier 34-1 in this order. This procedure is the same as the case of transferring modified or new article sales data obtained by a regular processing of article sales data for storage. In such a conventional apparatus, the original sales data should be read and returned after they were once written in the random access memory 36 from the check key contact 32-3. But, if the original sales data are destroyed due to poor contact of the check key contact, erroneous access to the random access memory 36 or the like, the original sales data are lost and thus there is the possibility that the check key 31 cannot be used thereafter.

Figure 8:
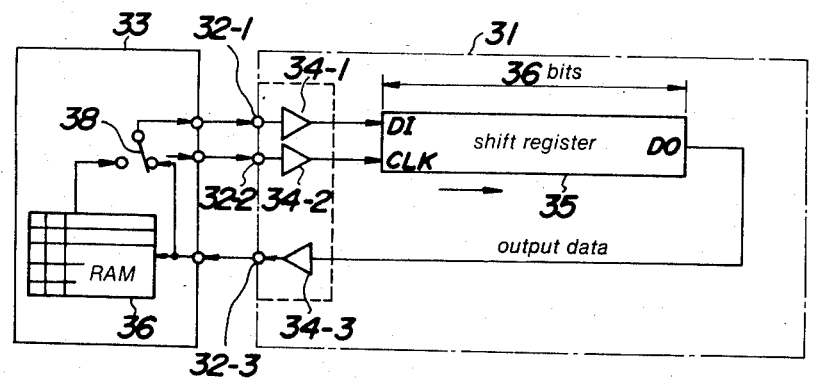
FIG. 8 is a block diagram showing an embodiment of sales data transmitting and receiving section in a sales data storing device in a vending machine in accordance with the present invention.

An embodiment of a data transmission and receiving portion between a shift register in a check key and a control unit for processing sales data in a vending machine according to the present invention is shown in FIG. 8, in which the above-described destruction or loss of the stored data are prevented.

In the arrangement shown in FIG. 8, numeral 38 designates a change-over switch for controlling output data.

When new article sales data which was refreshed in response to the sales of articles by the control unit 33 are transferred from the random access memory 36 to the shift register 35 so that the new article sales data are written in the shift register 35, the switch 38 is changed to the output side of the random access memory 36. On the other hand, when the stored data are transferred from the shift register 35 to the random access memory 36 so that the data are written in the memory 36, the switch 38 is changed to the input side of the random access memory 36. As a result, the memory data appeared at the check key contact 32-3 through the operational amplifier 34-3 from the shift register 35 are supplied to the random access memory 36 and at the same time the memory data are returned from the switch 38 to the shift register 35 through the check key contact 32-1 and the operational amplifier 34-1 in this order.

Figure 9:
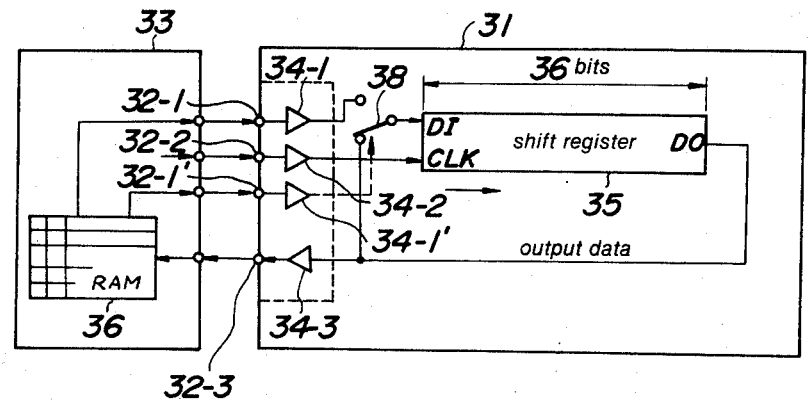
FIG. 9 is a block diagram showing another embodiment of the sales data transmitting and receiving section in the present invention.

Alternatively, the switch 38 may be arranged on the side of the check key body 31 instead of the side of the control unit 33. For example, as shown in FIG. 9, the output read from the memory 36 is directly supplied to the operational amplifier 34-1 via the contact 32-1. The switch 38 is connected to the output terminal of the operational amplifier 34-1, so that either the output read from the shift register 35 or the memory output from the operational amplifier 34-1 is written in the shift register 35 through the switch 38. Here, the switch 38 is changed by the control unit 33.

With the above-described arrangement of the data transmission and receiving portion between the shift register 35 in the check key body 31 and the random access memory 36 in the control unit 33, in accordance with the present invention, if the memory data read from the shift register 35 is directly written again in the same shift register without modification, no problem as encountered in the prior art arrangement occurs, even if the stored data transferred to the random access memory 36 is destroyed. Thus, if the result of the address collation shows inconsistency, the check key 31 is immediately rejected without requiring further data processing.

Accordingly, there is not the possibility that the data stored in the memory for storing sales data, which is loaded to the vending machine to read out the memory data, do not disappear undesirably. This may aid the development of an efficient data processing program. Moreover, since it is assumed that necessary data are always stored in the check key body 31, control logic of the control unit 33 in the vending machine can be designed in a relatively simple manner.

When the shift register is in use, it is loaded to the vending machine in a hotel room in order to transmit and receive article sales data through the check key contact and therefore this structure essentially involves a problem that a reliability in connection with the phsical contact of the check key contact. Aside from a continuous contact failure in connection with at least one of a plurality of contacts interposed between the controller in the vending machine and the external shift register, in case of an error in data due to an irregular momentary occurrence of contact failure of the check key contact, the shorter the period during which data pass through the contact portion and the smaller the frequency of such passage, the lower the probability of an error of data, thus increasing the reliability. In view of the foregoing, there is a great difference between the conventional arrangement shown in FIG. 7 and the arrangement of the present invention shown in FIG. 8 in respect of an arrangement of the period during which transfer data pass through the check key contact, as illustrated by the time charts of data transfer in FIGS. 10(A)-(D) and FIGS. 11(A)-(D).

Figure 10:
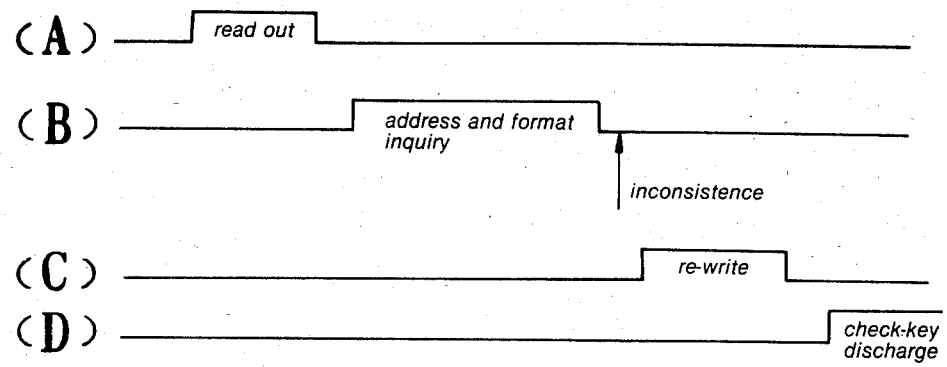
FIGS. 10A, 10B, 10C and 10D are time charts sequentially illustrating the processes of sales data transmission and reception in the prior art vending machine, respectively.

That is, in the conventional arrangement shown in FIG. 7, as illustrated in FIG. 10(A), the period in FIG. 10(A) during which the sales data read from the shift register 35 pass through the check key contact is distant in time from the period in FIG. 10(C) during which the sales data returned to the shift register 35 from the memory 36 pass through the check key contact. During the time distance, collations of addresses and format are carried out as illustrated in FIG. 10(B).

Figure 11:
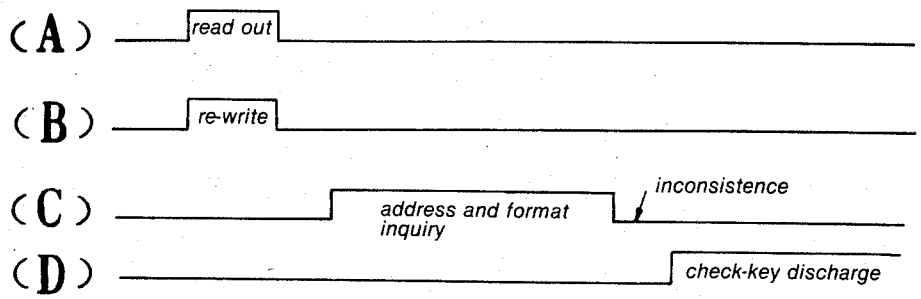
FIGS. 11A, 11B, 11C, and 11D are time charts sequentially illustrating the processes of sales data transmission and reception in accordance with the present invention, respectively.

On the other hand, in the apparatus of the present invention shown in FIG. 8, the period in FIG. 11(A) during which the sales data read from the shift register 35 pass through the check key contact is coincident in time with the period in FIG. 11(B) during which the sales data returned to the shift register 35 immediately after the reading out from the shift register 35. After the coincidence, collations of addresses and format are carried out as illustrated in FIG. 11(C). Therefore, the probability of occurrence of data error due to a momentary occurrence of contact failure of the check key contact is greatly decreased in the apparatus of the present invention as compared with the prior art. Thus, the reliability is improved accordingly. FIG. 10(D) and FIG. 11(D) illustrate respectively timings that the check key is rejected.

As previously mentioned, in case that the change-over switch 38 is arranged in the check key body 31, the sales data themselves to be returned to the shift register 35 for re-write do not pass through the check key contact, so that the probability of occurrence of data error due to contact failure of the check key contact is further decreased to greatly increase the reliability.

It should be further noted that in the present invention, data in the check key which is read from the shift register 35 after the insertion of the check key are written into the memory 36 and at the same time are rewritten into the shift register 35. Thus, even if the data in the check key read into the memory 36 are destroyed after the collations of addresses and format, the destruction does not cause any trouble. That is, it is sufficient that the memory 36 merely stores data in the check key temporarily at the time of collation, so that there is no cause to suppress the memory capacity.

INDUSTRIAL APPLICABILITY

As is clear from the foregoing, in accordance with the present invention, three kinds of sales data, i.e., the reference number data, sales number data and data indicating the number of articles left in the vending machine, are calculated in a stable condition that the outer door is closed after the completion of the sales operation, so that it is possible to obtain stable and reliable sales data without being destroyed due to tampering or the like. That is, the present invention has the following advantageous effects.

(1) In the case that a vending machine is used in a hotel room with closed doors, it is important to elliminate an influence caused by tampering or irregular use. According to the present invention, sales data are prepared only in a condition that the outer door is closed, so that the sales data is highly stable and reliable.

(2) Even if sales data are destroyed due to tampering or irregular use, the sales data can be restored by the data stored in the central processing unit.

(3) Since the article retaining condition in the commodity rack is always sensed, it is possible to elliminate unreasonable calculation due to error in calculation afected by external noises or irregular use.

(4) Since only the number of sold articles of each kind of article is stored as sales data in predetermined addresses, it is easy to reduce the memory capacity and to increase the number of articles to be sold, and it is also easy to monitor the number of articles to be supplemented.

Moreover, in accordance with the present invention, sales data are stored in the shift register which is encased in the check key or the like which is to be loaded to the vending machine with doors in a hotel room and when the data are transferred to the memory in the vending machine in order to modify the sales data in response to the sales of articles, the memory can be efficiently used. Thus, even the one chip microprocessor having a random access memory with small memory capacity can be used. In addition, a probability that sales data is destroyed due to mainly contact failure of terminal contacts for loading the check key is reduced, so that a reliability of an apparatus for storing sales data is increased greatly as compared to the prior art apparatus.

Further, a vending machine with doors according to the present invention is not limited to a vending machine of a so-called hotel vending system, but may also be applied to various kinds of vending machines wherein sales data are stored in an external register which may be in the portable form so that the sales data can be moved.

What is claimed is:

1. A vending machine with doors, comprising:
    a storage member for accommodating a plural kinds of articles, with one or a plurality of articles of each kind of article being allotted at a predetermined portion therein;
    an inner door attached to said storage member for allowing a supplement of said article while said inner door is opened and for allowing a delivery of said article while said inner door is closed;
    an outer door provided outside of said inner door for prohibiting a delivery of said article while said outer door is closed;
    means for sensing as sales information the respective numbers of said a plural kinds of articles accommodated in said storage member;
    a first memory means for storing reference number data indicative of the number of articles to be accommodated in said storage member, sales number data indicative of the number of articles sold and remaining number data indicative of the number of articles left in said storage member after said outer door is closed, separately by each kind of article of said plural kinds of articles;
    means for clearing said sales number data to initialize the respective ones of said reference number data and the respective ones of said remaining number data to the respective ones of said number of articles sensed by said sensing means;
    sales counting means to be started after the operation of closing said outer door for modifying the respective ones of said remaining number data by the respective ones of said number of articles sensed by said sensing means, for subtracting the respective ones of modified remaining number data from the respective ones of the stored reference number data to calculate respective ones of said sales number data and for storing the respective ones of the calculated sales number data;
    supplementary counting means to be started at least after the operation of closing said inner door for modifying the respective ones of said remaining number data by the respective ones of said number of articles sensed by said sensing means, for adding the respective ones of modified remaining number data to the respective ones of the stored reference number data to calculate respective ones of said reference number data and for storing the respective ones of the calculated reference number data; and
    reading means to be started after the termination of the operation of said sales counting means for reading out said sales number data from said first memory means to transfer the sales number data read out to a second memory means provided outside of said vending machine.

2. A vending machine as claimed in claim 1, wherein said second memory means comprises:
    a body detachable from said vending machine;
    a register contained in said vending machine and being electrically connectable to said first memory means when said body is loaded to said vending machine for storing predetermined addresses and said sales number data;
    transmitting means for transmitting the addresses and the sales number data stored in said register to said vending machine in synchronism with a clock signal from said vending machine; and wherein
    said vending machine comprises:
    a third memory means for storing the addresses and the sales number data transmitted from said register in said second memory means;
    comparison means for comparing the addresses and the sales number data stored in said third memory means with the addresses set in said vending machine and the sales number data stored in said first memory means, respectively; and
    means for rejecting said second memory means when the result of the comparison shows that both the addresses are not in consistence.

3. A vending machine as claimed in claim 2, wherein said transmitting means comprises means for transmitting the addresses and sales number data read out from said register to said vending machine and for re-writing simultaneously the thus transmitted addesses and sales number data to said register.

4. A vending machine as claimed in claim 3, wherein said outer door comprises a lock mechanism to be openable in response to the loading of said second memory means to said vending machine.

5. A vending machine as claimed in claim 2, wherein said outer door comprises a lock mechanism to be openable in response to the loading of said second memory means to said vending machine.

* * * * *